Patented Apr. 18, 1950

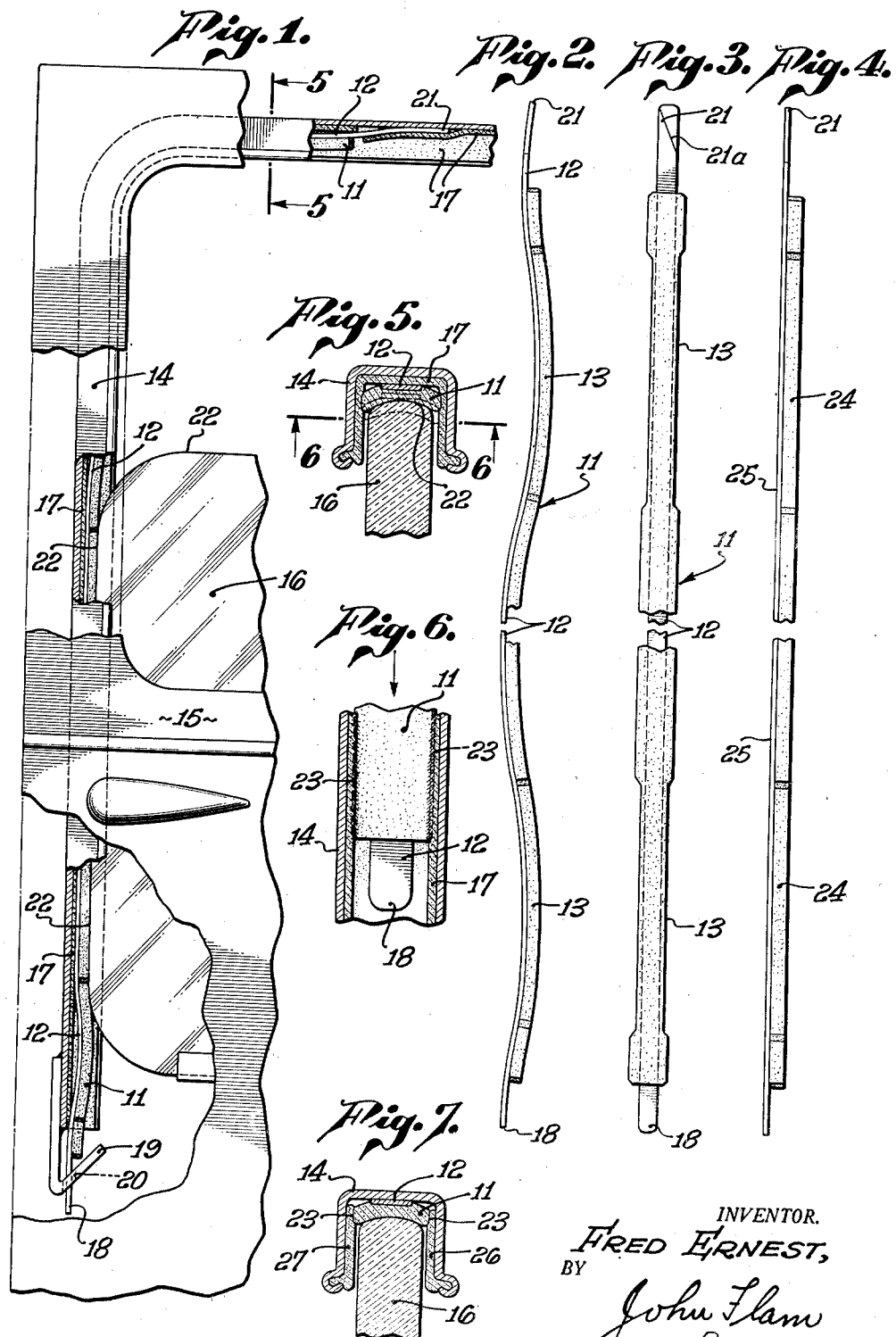

2,504,510

UNITED STATES PATENT OFFICE 2,504,510

WINDOW TIGHTENER

Fred Ernest, Gardena, Calif.

Application September 13, 1948, Serial No. 49,050

10 Claims. (Cl. 296—44.5)

1

This invention relates to devices adapted to prevent the rattling of slidable windows, and more particularly the windows on automobile doors.

In order to prevent the rattling of windows slidable in channels, felt, or other fabric material, is commonly provided in the channels to engage the edges of the window. These liners become worn and matted down after continued use, and the window becomes loose and rattles within the frame. It is an object of this invention to provide a simple and inexpensive device to prevent the rattling of such slidable windows.

Devices have been heretofore proposed for preventing the sliding windows of automobiles from rattling; but these devices are often mechanically complex, and the installation thereof generally entails considerable time and effort. Furthermore, a replacement of the fabric liner itself ordinarily requires that the automobile door and window be dismantled. It is accordingly another object of this invention to provide an improved form of window securing apparatus in which it is unnecessary to disassemble any portion of the automobile.

It is still another object of this invention to provide a device for preventing the rattling of automobile door windows that is light in weight, easily installed, and adaptable to all forms of window designs and shapes.

It is still another object of this invention to provide a device for preventing the rattling of automobile door windows that can be economically manufactured, as by stamping, from standard material, and that may be easily handled, stored, and shipped.

It is still another object of this invention to provide a window slide channel of simple and inexpensive construction that may, if desired, be utilized as an original installation on new cars.

When the original liners become worn and matted, not only may the windows rattle, but the seal between the window and the channel is destroyed, and drafts of air may enter the inside of the automobile. Accordingly, it is a further object of this invention to provide a window tightener that will serve to prevent the entrance of air around the edges of the windows by providing a new seal between the window and the channel member in which it slides.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is an elevation of an automobile door and sliding window, partly broken away, showing the device installed on an automobile structure;

Fig. 2 is a side view showing one embodiment of this invention;

Fig. 3 is a plan view of this embodiment, showing how the ends of the device are formed;

Fig. 4 is a side view showing another embodiment of this invention;

Fig. 5 is a sectional view taken along the plane indicated by the line 5—5 of Fig. 1;

Fig. 6 is a sectional view taken along the plane indicated by the line 6—6 of Fig. 5; and Fig. 7 is a sectional view similar to Fig. 5, showing the adaptation of this invention to existing window supporting structure of a different form, the invention here being particularly adapted for original installation in a new automobile.

A strip 11 forms one element or liner of the window tightener. This strip 11 is made from suitable fabric material, such as felt. This strip 11 is attached, as by an adhesive, to a flexible guiding means 12, serving as a backing for the strip 11. This means 12 is preferably of metal, although other materials can be used. The guiding means or backing strip 12 is of sturdy material, and it is capable of flexure in order to conform to many shapes of automobile structures, and to facilitate installation of the device therein. Since the strip 12 is of uniform cross section, it is uniformly flexible throughout substantially its entire length. The window tightener may be suitably coiled in rolls, facilitating easy handling, storage, and shipment.

In the forms shown in Figs. 2 and 3, the backing strip 12 is of sinuous configuration, forming alternate crests and troughs. Adjacent the crest portions, the width of the liner 11 is reduced, as indicated at 13.

According to the dimensions of the particular frame to which the window tightener is to be adapted, a length of liner 11 and strip 12 is cut from the roll stock. The strip 12 should be of sufficient length so that it may extend past the bottom extremity of the channel 14 and also to the top portion of the window frame 15, as illustrated in Fig. 1. The strips 12 are thus of sufficient length that the window 16 contacts at least a portion of the tightener regardless of the position of the window within its frame.

A small portion of the liner 11 is removed adjacent each end of the strip 12 in order to facilitate the installation of the tightener. The width of the liner 11 adjacent the troughs is slightly greater than the free distance across the channel 14 between the worn felt 17, velour, or other fabric material lining the channel 14. The forward end 18 of the strip 12 is slidably inserted longitudinally of the channel member 14 until the tip 18 abuts the stop 19 adjacent the lowest extremity of the channel 14. This stop 19 may be suitably apertured, as at 20, in order to receive the end 18 of the strip 12. Sliding the liner 11 longitudinally of the channel 14, and the existing felt 17, for insertion is easily accomplished, since the guiding means or strip 12 can, without appreciable buckling, readily sustain the force urging the device in place.

When provided in strip form, the trailing end 21 of the window tightener may be scored, as at 21—a, which makes it very easy to break off the corner along this scoring. The taper is thus conveniently formed immediately preceding installation of the tightener.

When inserting the tightener, as in Fig. 1, the trailing pointed end 21 is inserted between the channel 14 and the existing material 17, leaving a small bulge in the strip 12, as shown by the dotted line position. The tightener is then finally positioned by flattening the bulge so formed into the channel 14, as illustrated by the full line position.

Two strips of sufficient length may be inserted into the sides of the window 16, meeting at the top. Thus, the window 16 is in contact with the tightener at its top and side edges when closed.

As shown in Figs. 5 and 7, the liner 11, having a maximum width greater than that in the space between the existing worn felt 17, or other material, is urged to form a channel-like configuration, pressing against the edges 22 of the window 16. Thus, lateral as well as longitudinal support for the window is achieved, and rattling is thereby prevented. The wave configuration of the strip 12 ensures, by spring action, a positive cooperation of the window tightener with the edge 22 of the window 16. The reduced portion 13, adjacent the elevated portions of the strip 11, eliminates lateral friction so that the spring action of the strips 12 may take effect.

While insertion of the liner 11 does not require any material force, any attempt to withdraw the liner is quite strongly resisted. This occurs because of the nature of the structure of the felt material used for line 11, or other similar fabric materials. Felt is made up of indiscriminately placed hair-like elements, such as wool fibers. Many of these lie transverse of the strip 11 at its edges 23 (Fig. 6). When inserting the device, as by being urged downwardly (as viewed in Fig. 6), these elements are swept upward with relation to the edges 23. However, when a force is applied to pull the device upwardly, the ends of these elements catch or hook into the fabric liner 17 of the channel 14 and resist this movement. This phenomenon adds permanence and stability to the installation, which the motion of the window 16 within the frame 15 does not alter.

Regardless of the form of existing structure (being either that shown in Fig. 5 or in Fig. 7), the window tightener cooperates with the existing material and channel member to form an effective seal, preventing drafts of air from entering the interior of the automobile from the outside.

The modified form shown in Fig. 4 is similar to the preferred form illustrated in Fig. 3, but the liner 24 and strip 25 have a plane configuration as compared with the wave configuration of the preferred form. This form of window tightener similarly functions to form a channel-like cross section, and supports the window from lateral as well as longitudinal movement by contacting the edge 22 of the window 16.

Either form of window tightener is adapted to form a part of the original installation on new cars. For this purpose, the channel member 14 is lined only on its sides, as at 26 and 27, the strip 12 contacting the bottom of the channel 14. Contact between the edges 23 of the liner 11 and the lining material 26 and 27 serves to maintain the position of the tightener within the channel. The liner 11 is of such width that it is urged into a channel-like configuration, supporting the window 16 in substantially the same manner as in Fig. 5. A replacement of the tightener in this structure constitutes a replacement of the original liner, and this replacement is easily accomplished in the manner set forth in connection with Fig. 1.

The inventor claims:

1. In a tightening device readily insertable into an existing window channel: a flexible guiding strip; and a strip member attached to the supporting guiding strip, and having edges overhanging the edges of the guiding strip, said member being made from material that can be flexed longitudinally adjacent the edges, said material having hair-like elements projecting transversely of the member at the edges.

2. In a tightening device readily insertable into an existing window channel: a longitudinally sinuous resilient guiding strip; and a felt member attached to the strip, and having edges overhanging the edges of the supporting strip.

3. In a device for guiding a sliding window: means forming a channel; fabric material lining the sides of the channel; a fabric strip having a width greater than the space across the channel; and flexible guiding means attached to the strip.

4. In a device of the character described: means forming a channel; fabric material lining at least the sides of the channel; flexible guiding means slidable in said channel; and a fabric strip attached to said means having a width greater than the free space between the sides of the channel, and forming a channel-like configuration therein.

5. In a window tightener: a slidable strip having uniform flexibility throughout substantially its entire length, said strip being provided at its end with a readily severable portion to provide a pointed end for the strip; and a fabric strip attached to said slidable strip and having edges overhanging the edges of the slidable strip.

6. In a window tightener adapted to be inserted within a lined window channel: a slidable strip having uniform flexibility throughout substantially its entire length, said strip having a pointed end adapted to pierce the lining of the channel; and a fabric member attached to the strip and having edges overhanging the edges of the strip.

7. In a tightening device readily insertable into an existing window channel: an elongated strip of yielding material adapted to engage the edge surface of a window, and to extend lengthwise along said edge surface, the strip having longitudinal edge surfaces that are free; and flexible means for guiding said strip into position with respect to the edge surface of the window, comprising a member extending longitudinally of the strip and having uniform transverse flexibility throughout substantially its entire length.

8. In a tightening device readily insertable into an existing window channel: an elongated fabric strip; and an elongated flexible guiding means having a substantially flat cross section for guiding the strip into the channel, and attached to the strip longitudinally therealong, said guiding means having substantially uniform transverse flexibility throughout substantially its entire length; at least a part of the strip extending beyond the longitudinal edge of the guiding means.

9. In a tightening device readily insertable into an existing window channel: an elongated fabric strip; and an elongated flexible guiding means having a substantially flat cross section for guiding the strip into the channel, said guiding means being sinuous in a direction longitudinally of the guiding means, said guiding means having substantially uniform transverse flexibility throughout substantially its entire length; said strip and means being longitudinally joined together.

10. In a tightening device readily insertable into an existing window channel: an elongated fabric strip; and an elongated flexible guiding means having a substantially flat cross section for guiding the strip into the channel, said guiding means being sinuous in a direction longitudinally of the guiding means, said guiding means having substantially uniform transverse flexibility throughout substantially its entire length; said strip and means being longitudinally joined together; said strip having portions extending beyond the longitudinal edge of the guiding means, and said strip, at and adjacent the crests of the sinuous guiding means, being narrower than at other parts of the guiding means.

FRED ERNEST.

REFERENCES CITED

The following references are of record in the file of this patent:

UNITED STATES PATENTS

| Number | Name | Date |
|---|---|---|
| 2,169,792 | Dean | Aug. 15, 1939 |
| 2,182,687 | Bailey | Dec. 5, 1939 |

FOREIGN PATENTS

| Number | Country | Date |
|---|---|---|
| 237,753 | Great Britain | Aug. 6, 1925 |
| 386,200 | Great Britain | Jan. 12, 1933 |
| 623,022 | France | May 22, 1928 |